United States Patent
Capps, Jr. et al.

[11] Patent Number: 6,115,773
[45] Date of Patent: Sep. 5, 2000

[54] CIRCUIT FOR DETECTING IMPROPER BUS TERMINATION ON A SCSI BUS

[75] Inventors: Louis Bennie Capps, Jr., Round Rock; Robert Christopher Dixon, Austin; Thoi Nguyen, Austin; Khuong Huu Pham, Austin, all of Tex.

[73] Assignee: International Business Machines Corporation, Armonk, N.Y.

[21] Appl. No.: 09/159,958

[22] Filed: Sep. 24, 1998

[51] Int. Cl.[7] .......................... G06F 13/00; G01R 27/00; H03K 19/08
[52] U.S. Cl. ............................. 710/129; 710/101; 326/30
[58] Field of Search ..................................... 710/100, 101, 710/126, 129; 326/21, 30, 56; 370/401, 402; 324/600, 610; 375/257, 229; 333/32, 124; 340/661; 713/600

[56] References Cited

U.S. PATENT DOCUMENTS

| | | |
|---|---|---|
| 3,832,575 | 8/1974 | Dasgupta et al. . |
| 5,214,670 | 5/1993 | Ballatore . |
| 5,311,081 | 5/1994 | Donaldson et al. . |
| 5,559,440 | 9/1996 | Lopresti et al. . |
| 5,748,910 | 5/1998 | Herrera . |
| 5,821,767 | 10/1998 | Osaka et al. . |

*Primary Examiner*—Gopal C. Ray
*Attorney, Agent, or Firm*—Joseph P. Lally; Leslie A. Van Leeuwen

[57] ABSTRACT

A bus termination impedance verification circuit. The verification circuit includes a sense circuit comprised of a sense input node and a sense output node. A sense node of the sense circuit is connected to a signal conductor of a bus to detect the termination impedance of the bus. The voltage of the sense output node is indicative of the termination impedance of the bus when the sense circuit input node is activated. The comparator circuit includes a comparator input node and a comparator output node. The comparator input node is connected to the sense circuit output node. The comparator circuit is configured such that the comparator output node is indicative of whether the voltage of the comparator input node is within a specified voltage range. The voltage of the signal conductor, as detected by the sense circuit, will be a function of the impedance of the termination circuits connected to the bus. An excess or shortage of termination circuits connected to the bus will result in a detected control signal voltage that is not within the specified limits.

19 Claims, 4 Drawing Sheets

CIRCUIT FOR DETECTING IMPROPER BUS TERMINATION ON A SCSI BUS

BACKGROUND

1. Field of the Present Invention

The present invention generally relates to the proper termination of a signal bus such as a SCSI bus in a computer system and more particularly with a circuit for detecting improper bus termination on a SCSI bus.

2. History of Related Art

To promote interconnectability and flexibility among the many manufacturers and vendors of computers and their associated peripheral devices, industry standard bus architectures are from time to time defined and implemented by organizations such as the American National Standards Institute (ANSI). These groups are typically comprised of representatives from the computer equipment industry. When computers are implemented with and peripheral devices are compliant with a standardized bus architecture, consumers benefit from the ability to choose among a variety of vendors when purchasing peripheral devices and from reduced complexities associated with integrating peripheral components from multiple vendors with a particular computer system.

A widely popular bus architecture commonly used for interconnecting various types of peripheral devices such as hard drives, CD drives, optical units such as scanners, and tape drive systems is the Small Computer Systems Interface (SCSI). The original SCSI specification was promulgated by ANSI and has been revised and updated periodically. The currently released version of SCSI, denoted SCSI-2 and issued in 1994, defines mechanical, electrical, and functional specifications for compliant peripheral devices. SCSI is a high performance bus standard that permits a plurality of devices to be connected to a single bus and controlled by a single SCSI controller. Because of its high performance and flexibility, SCSI has become an extremely widely implemented bus familiar to a huge number of consumers. Despite this familiarity, however, the consuming public and even some more sophisticated users of small computers frequently encounter difficulty in properly terminating SCSI busses.

The SCSI specification includes a requirement that the SCSI bus be properly terminated at each end of the bus to preserve signal integrity. Although both passive and active termination schemes are encountered in practice, modern systems implementing data transfer rates in excess of 5 Mb/sec almost universally implement active termination schemes in which a resistor and voltage supply are connected in series to each end of each signal of the bus. The SCSI bus is almost universally implemented in a daisy chain fashion. Proper termination is achieved only when the devices at each end of the SCSI bus chain are terminated and when none of the intermediate devices are terminated. Thus, improper SCSI termination occurs if excessive (i.e. more than two) termination circuits are connected to the bus or if insufficient (i.e., less than two) termination circuits are present. Although relatively simple in concept, proper termination is sometimes difficult to implement. Many SCSI compliant peripherals include internal termination circuits that can be activated or deactivated using jumper switches or through software commands. It is therefore sometimes difficult to determine if a particular device is terminated or not. In addition, some devices have no internal termination circuits at all and require the addition of external termination circuits (if those devices are located at the end of the SCSI bus). The combination of internal and external terminators can result in confusion that may lead to an improperly terminated bus. Even if one determines which devices include termination circuits (whether internal or external) it is not always apparent which devices are physically located at the end of a SCSI bus. A SCSI controller or host adapter may, in some configurations, reside at the end of the SCSI and therefore require termination while, in other configurations, the controller may reside in the middle of the bus. Moreover, a bus that is initially properly terminated may become improperly terminated when additional devices are added to the SCSI bus. Improper termination, in any of its various forms, can degrade the integrity of signals travelling along the SCSI bus, decrease the noise tolerance of the bus, and generally result in the occurrence of erroneous signals and unreliable operation. The difficulties associated with achieving a properly terminated SCSI bus and the practical difficulties of knowing when a bus is improperly terminated suggest the need for a reliable yet practical device for detecting an improperly terminated SCSI bus.

SUMMARY OF THE INVENTION

The problems identified above are in large part addressed by an inexpensive circuit that is selectably connected to one of the SCSI signals to detect the presence or lack of an appropriate bus termination impedance. The circuit preferably produces a digital output that indicates whether the termination impedance detected on the bus is within a specified range of a predicted value. If the detected impedance is too low, excessive (i.e., more than two) bus termination circuits are present while if the detected impedance is too high, insufficient (i.e., zero or one) termination circuits are present.

Broadly speaking, the present invention contemplates a bus termination impedance verification circuit. The verification circuit includes a sense circuit comprised of a sense input node and a sense output node. A sense node of the sense circuit is connected to a signal conductor of a bus to detect the termination impedance of the bus. The voltage of the sense output node is indicative of the termination impedance of the bus when the sense circuit input node is activated. The comparator circuit includes a comparator input node and a comparator output node. The comparator input node is connected to the sense circuit output node. The comparator circuit is configured such that the comparator output node is indicative of whether the voltage of the comparator input node is within a specified voltage range. The voltage of the signal conductor, as detected by the sense circuit, will be a function of the impedance of the termination circuits connected to the bus. An excess or shortage of termination circuits connected to the bus will result in a detected control signal voltage that is not within the specified limits.

In one embodiment, the sense circuit includes a resistor and a sense transistor. The resistor and the output terminals of the sense transistor are connected in series between the signal conductor and ground. In the preferred arrangement, a first terminal of the resistor is connected to the signal conductor and to the sense output node and a second terminal of the resistor is connected to an output terminal of the sense transistor. In the preferred embodiment, the sense transistor is an npn bipolar transistor, the collector terminal of the transistor is connected to a second terminal of the resistor and the emitter terminal of the transistor is grounded. In an alternative embodiment, the transistor is an MOS transistor in which the drain is connected to the sense resistor and the source is grounded.

The comparator circuit preferably includes a reference voltage stage and a window detection circuit. The reference voltage stage is configured to generate a high voltage reference level and a low reference voltage reference level. The window detection circuit is configured to receive the high voltage reference level, the low voltage reference level, and the comparator circuit input node, which is connected to the sense circuit output node. The window detection circuit is configured to indicate if a voltage of the comparator input node is greater than or equal to the low voltage reference level and less than or equal to the high voltage reference level. The reference voltage stage preferably includes a voltage divider circuit coupled to a reference voltage generator. The voltage divider circuit includes a high voltage reference node and a low voltage reference node. In one embodiment, the voltage divider circuit includes three resistors coupled in series between ground and an output node of the reference voltage generator.

In one embodiment, the reference voltage generator includes an operational amplifier. The output terminal of the amplifier is fed back to the inverting input terminal. A reference voltage conductor ties the non-inverting input terminal of the amplifier to a reference signal conductor of the bus through a series resistor. The reference voltage generator preferably further includes a stabilizing capacitor coupled between ground and the non-inverting input of the amplifier.

The window detection circuit preferably includes first and second comparators. A positive input of the first comparator is connected to the high voltage reference level and a negative input is connected to the comparator circuit input node. The preferred embodiment of the first comparator is configured to produce a logical output indicative of whether a voltage of its positive input is greater than a voltage of its negative input. The negative input of the second comparator is connected to the low voltage reference level while its positive input is connected to the comparator circuit input node. The preferred second comparator is configured to produce a logical output indicative of whether a voltage of the negative input is less than a voltage of the positive input. In one embodiment, the output node of the first comparator and an output of the second comparator are connected to a common node and a logical state of the common node is the dot product of the first output node and the second output node.

The present invention further contemplates a SCSI controller including a local bus control block, a SCSI control block, processing logic, and a termination impedance detection circuit. The local bus control block is configured to transmit and receive local bus address, data, and control signals to and from a local bus to which the controller is connected. In the preferred embodiment, the local bus comprises an industry standard PCI bus. The SCSI control block is configured to transmit and receive SCSI bus address, data, and control signals to and from a SCSI bus to which the controller is connected. The processing logic is coupled between the local bus control block and the SCSI control block and is configured to serve as a bridge between the two busses. The processing logic receives and interprets the local bus control and address signals from the local bus and the SCSI control and address signals from the SCSI bus and passes data between the busses SCSI control block in response to the received signals. The termination impedance verification circuit includes a sense circuit and a comparator circuit. The sense circuit includes a sense input node and a sense output node. The sense circuit is coupled to one of the SCSI control signals. The voltage of the sense output node is indicative of a termination impedance of the SCSI bus when the sense circuit input node is activated. The comparator circuit includes a comparator input node and a comparator output node. The comparator input node is connected to the sense circuit output node. The comparator circuit is configured such that the comparator output circuit is indicative of whether the voltage of the comparator input node is within a specified voltage range. In one embodiment of the controller, the termination impedance verification circuit further includes a second transistor including an input terminal coupled to a second input signal and a pair of output terminals coupled between ground and the SCSI control signal sensed by the sense circuit and ground. In this embodiment, the verification preferably further includes timing logic. An input node of the timing logic is connected to one of the SCSI control signals produced by the processing logic of the controller. The timing circuit is configured to activate the sense circuit for a first duration and, thereafter, to activate the second transistor for a second duration to fully assert the signal.

The present invention still further contemplates a computer system including a central processing unit such as an x86 family microprocessor, an external cache memory, a memory controller/bus bridge (MC/BB), a main memory, and a SCSI controller including a termination impedance verification circuit. The MC/BB, the CPU, the external cache memory, are coupled via a processor bus. The MC/BB is configured as a bus bridge between a local bus, such as a PCI bus, and the processor bus. In one embodiment, the main memory is coupled to the MC/BB over the local bus. The SCSI controller is connected to the local bus. The SCSI controller provides a bridge between the local bus and a SCSI bus coupled to the SCSI controller. The SCSI controller includes a bus termination impedance verification circuit, wherein the bus verification circuit is configured to detect the presence of improper bus termination on the SCSI bus.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
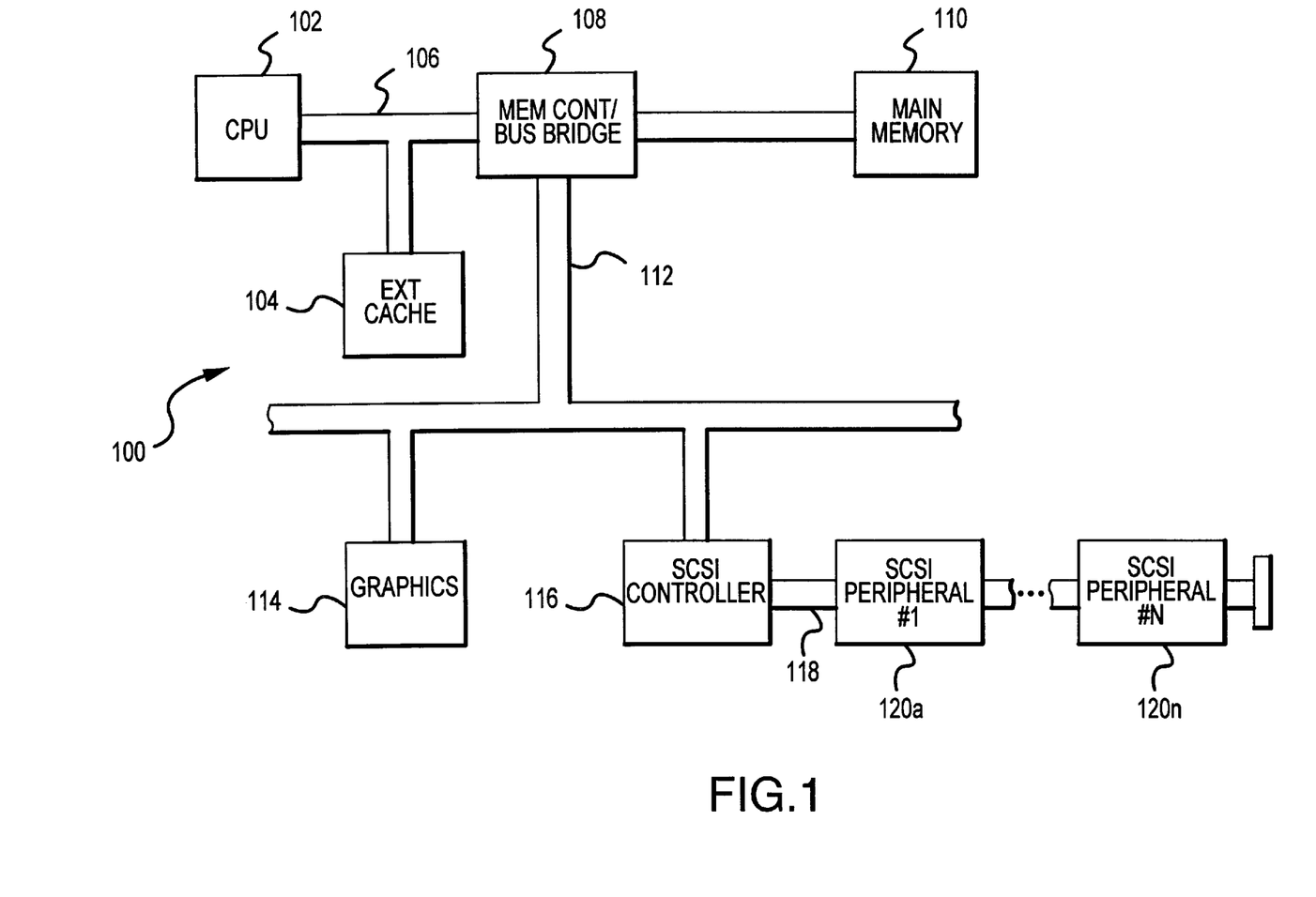
FIG. 1 is a partial block diagram of a computer system according to the present invention including a SCSI controller with a bus termination impedance verification circuit.

Turning now to the drawings, FIG. 1 depicts a partial block diagram of a computer system 100 according to the present invention. Computer system 100 includes a central processing unit (CPU) 102 coupled to an external cache memory 104 and an integrated memory controller/bus bridge (MC/BB) 108 via a processor bus 106. CPU 102 may, in one embodiment, comprise an industry standard processor such as an x86 family microprocessor or other suitable processor. External cache memory 104 is suitably interfaced to CPU 102 to improve performance by saving recently accessed memory storage locations in a relatively small but fast bank of memory. Typically implemented with extremely fast memories such as static RAMs, external cache memory 104 is more expensive than its slower but more dense counter part, the dynamic RAM. Dynamic RAM devices are typically the foundation of main memory 100, which is coupled to the processor bus in the depicted embodiment through an intermediate MC/BB 108. The arrangement of memory devices and controller devices in relation to CPU 102 depicted in FIG. 1 is but one of a variety of acceptable arrangements. In an alternative embodiment not shown, external cache 104 resides between CPU 102 and MC/BB 108 such that each memory access of CPU 102 must occur through external cache 104. Those familiar with small computer architectures will further appreciated that CPU 102 may incorporate an internal cache memory and may optionally exclude external cache memory 106 entirely. In such an embodiment, any read access by CPU 102 to a memory location whose content is not currently stored in the internal cache of CPU 102 must produce an access to main memory 110.

Integrated MC/BB 108 provides a bridge between the processor bus 106 and a local bus designated as reference numeral 112 in FIG. 1. Local bus 112 provides a standardized set of data, address, and control signals to a variety of peripheral devices connected to local bus 112. An example of one such peripheral device includes the graphics card peripheral device 114 although numerous other peripheral devices may be simultaneously connected to local bus 112. In a presently preferred embodiment, local bus 112 is compliant with the PCI bus architecture desirable because of its high performance and widespread acceptance and usage throughout the computer industry. Computer system 100 includes an SCSI controller 116 according to the present invention coupled between local bus 112 and a SCSI bus 118. SCSI bus 118 is suitably connected to one or more peripheral devices identified in FIG. 1 by reference numerals 120a through 120n, where n is typically less than 8 or 16 depending upon the implementation of SCSI bus 118. In addition to serving as a bridge between local bus 112 and a SCSI bus 118, SCSI controller 116 includes a bus termination impedance verification circuit 210 (not depicted in FIG. 1) that is described in greater detail below. A sensing node of verification circuit 210 is coupled to one of the signal lines of SCSI bus 118. Verification circuit 210 is configured to detect the presence of improper bus termination on SCSI bus 118. More specifically, verification circuit 210 is configured to sense a voltage of the SCSI signal to which circuit 210 is connected and, based upon the voltage sense, determine whether excessive or insufficient termination circuits are connected to SCSI bus 118. If more than two termination circuits are connected to SCSI bus 118, the Thevenin equivalent impedance of the termination circuits will drop and the sense voltage will reflect this drop. Similarly if less than two termination circuits are present, the equivalent impedance of the termination circuits will be greater than specified and the voltage sensed on the SCSI signal line will be altered accordingly. In either case, the improper termination is detected by the verification circuit 210.

Figure 2:
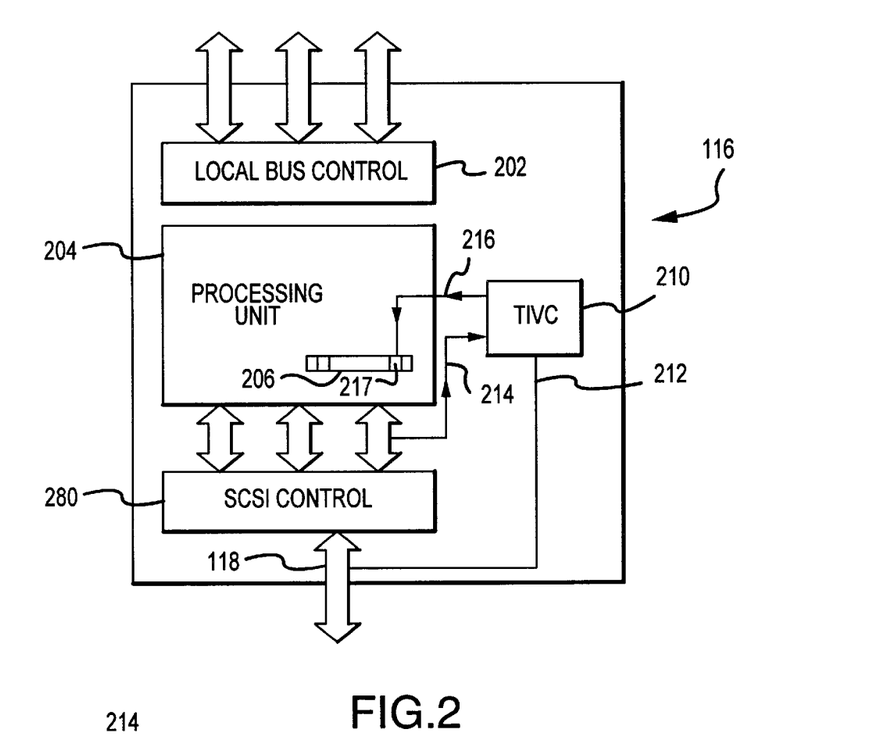
FIG. 2 is a partial block diagram of a SCSI controller implemented in the computer system of FIG. 1 and including a termination impedance verification circuit.

Turning now to FIG. 2, a partial block diagram of one embodiment of a SCSI controller 116 according to the present invention is depicted. SCSI controller 116 includes a local bus block 202 configured to transmit and receive local bus address, data, and control signals to and from local bus 112. SCSI controller 116 is configured with the capability to request and assert mastership of local bus 112 for providing data to CPU 102, main memory 110, or to other peripheral devices connected to local bus 112. SCSI controller 116 further includes a SCSI control block 208 for providing the SCSI compliant control, address, and data signals to SCSI bus 118. Coupled between local bus control block 202 and SCSI control block 208 is SCSI processing unit 204 configured to receive address and control signals from local bus 112 and SCSI bus 118 through control blocks 202 and 208 respectively and to pass data and addresses between the busses 112 and 118. Processing unit typically includes a sequential memory segment such as a FIFO device (not depicted) for providing the buffering of data that is typically required when bridging two busses operating at different frequencies. In addition, processing unit 204 may include one or more operating registers (not depicted) as well as a control register 206. Control register 206 may contain status bits affecting the operation of controller 116. Controller 116 further includes a bus termination impedance verification circuit 210. A sense node (not shown in FIG. 2) of verification circuit 210 is connected to one of the SCSI signals within SCSI bus 118 via a sense conductor 212. Verification circuit 210 further receives a SCSI control signal generated by processing unit 204 of controller 116 via control conductor 214. In response to detecting an appropriate signal on control conductor 214, verification circuit 210 is configured to sense the total termination impedance connected to SCSI bus 118 and generate an output that is indicative of whether the sensed termination impedance is within predetermined specified limits. In the embodiment depicted in FIG. 2, the output of verification circuit 210 is routed via output conductor 216 to control register 206 of controller 116, where a dedicated bit 217 is set or cleared. In this manner, the dedicated bit 217 indicates whether the termination impedance of SCSI bus 118 is correct. In other embodiments (not depicted) in which it is undesirable to dedicate a control register bit to the termination impedance status, the output of verification circuit 210 may be routed to an LED circuit to light an LED whenever an out of specification termination impedance is detected or to other suitable means of conveying the status of the termination impedance.

Figure 3:
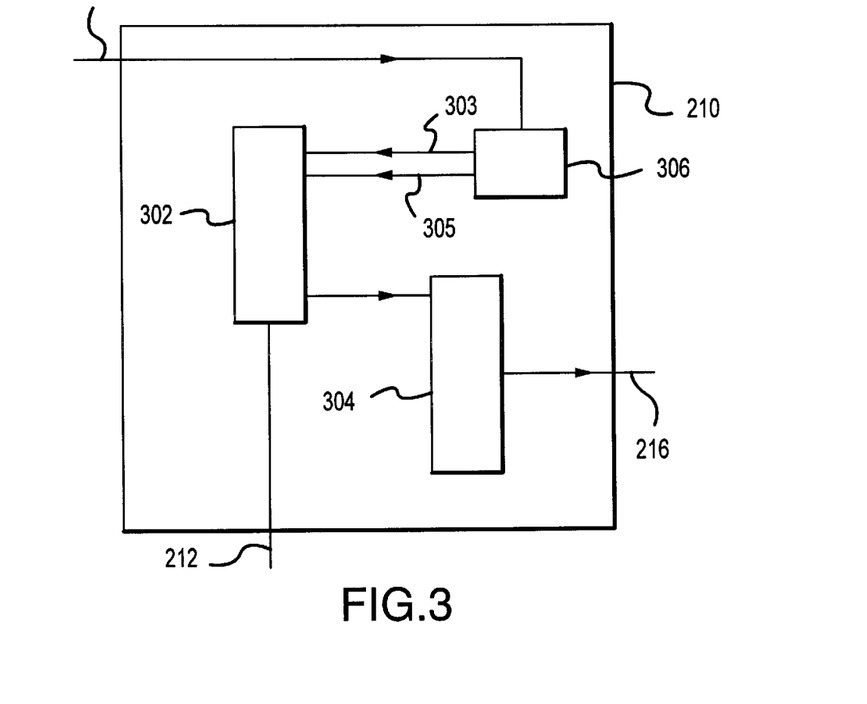
FIG. 3 is a partial block diagram of a termination impedance verification circuit according to the present invention.

Turning now to FIG. 3, a simplified block diagram of one embodiment of verification circuit 210 is shown. Verification circuit includes a sense circuit 302 and a comparator circuit 304. Sense circuit 302 is coupled to one of the signals lines of SCSI bus 118 via the sense conductor 212 and is configured to sense a voltage of the signal line, where the sensed voltage is indicative of the total termination impedance of SCSI bus 118. The output of sense circuit 302 is coupled to an input node of comparator circuit 304. Comparator circuit 304 is configured to produce an output indicative of whether the voltage sensed by sense circuit 302 is within predetermined specified limits. In the preferred embodiment, comparator circuit 304 has a digital output comprising a single bit of information to indicate whether the termination impedance of SCSI bus 118 is in or out of specification. The comparator circuit output is conveyed to an output conductor 216, where it may be routed to set a register bit, drive an LED circuit, or to another suitable circuit for indicating the termination impedance status. The embodiment of verification circuit 210 in FIG. 3 further includes a timing circuit 306. Timing circuit 306 receives a control signal from processing unit 204 of controller 116 and produces a pair of input signals 303 and 305 to sense circuit 302. The timing circuit 210 is configured to activate input signal 303 for a first duration and, after the first duration has ended, to activate second signal 305 for a second duration. The operation of these two signals is described in greater detail below. In one presently preferred embodiment, verification circuit 210 is implemented using the SCSI RESET signal. More specifically, the RESET signal generated by processing unit 204 of controller 116 is input to verification circuit 210. In response to an appropriate transition of the RESET signal, verification circuit 210 initiates the sensing function described previously. In addition to the use of the RESET signal to initiate the sensing functions, the RESET signal conductor of SCSI bus 118 may serve as the signal sensed by sense circuit 302. In other embodiments in which it may be desirable to initiate the verification process independently of the RESET signal, a different SCSI control signal may be utilized and a different SCSI bus signal may be sensed.

Figure 4:
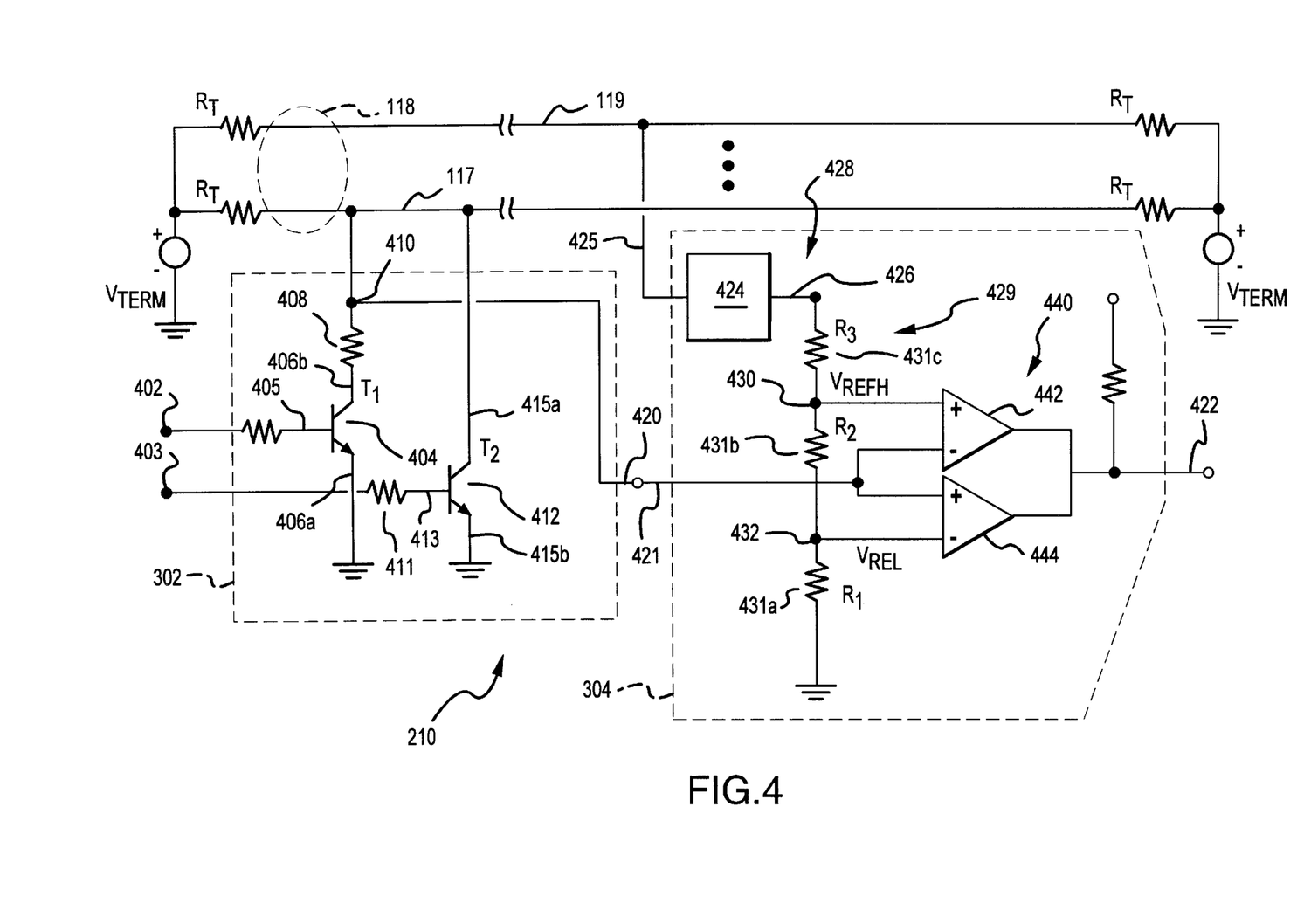
FIG. 4 is a partial circuit diagram of one embodiment of the verification circuit of FIG. 3.

Turning now to FIG. 4, one embodiment of a circuit level implementation of verification circuit 210 is shown. Sense circuit 302 includes a sense input node 402, a sense output node 420, and a sense node 410. Sense node 410 is connected a signal conductor 117 of SCSI bus 118. The simplified depiction of SCSI bus 118 depicted in FIG. 4 indicates the presence of active termination circuits at each end of the bus. The active termination circuits comprise termination resistors $R_T$ in series with a termination power supply $V_{TERM}$. Typically, the value of $R_T$ is 110 ω and the value of $V_{TERM}$ is approximately 2.85 V. Through inappropriate connections, a user or consumer of computing equipment may connect additional termination circuits to SCSI bus 118 or remove either or both of the termination circuits present at the ends of SCSI bus 118. Those familiar with electrical circuits will appreciate that the presence of a fewer or greater number of termination circuits on SCSI bus 118 will result in a change in the equivalent resistance coupled to the bus. This changed equivalent resistance is detected by sense circuit 302. More specifically, the embodiment of sense circuit 302 shown in FIG. 4 includes a transistor 404 and a resistor 408. In the preferred arrangement, resistor 408 is coupled in series with the output terminals 406a and 406b of transistor 404 between ground and sense node 410 of sense circuit 302. The input terminal 405 of transistor 404 is tied to input node 402. In the embodiment depicted, transistor 404 is an npn bipolar transistor in which the emitter terminal is grounded and the collector terminal tied to sense node 410 through series resistor 408. In other embodiment, the circuit depicted may be implemented with MOS technology. Those skilled in circuit analysis will appreciate that the voltage of sense node 410 when transistor 404 is activated will vary with the total equivalent impedance connected to SCSI bus 118. If, for example, the value of series resistor 408 is equal to ½ $R_T$ (the equivalent resistance of $R_T$ in parallel with $R_T$), the voltage of sense node 410 when transistor 404 is activated will be approximately ½ $V_{TERM}$. If additional termination circuits are connected to SCSI bus 118, the Thevenin equivalent impedance of the terminators coupled to SCSI bus 118 will drop and the voltage sensed at sense node 410 will rise accordingly. Similarly, if fewer than two termination circuits are present, the voltage of sense node 410 will drop. Thus, the voltage of sense node 410 is indicative of the termination impedance of SCSI bus 118 when transistor 404 is activated. In the embodiment depicted, the sense node 410 is connected directly to output node 420 of sense circuit 302 and serves as the input to comparator circuit 304.

The embodiment of sense circuit 302 shown in FIG. 4 further includes a second transistor 412. Second transistor 412 is designed to work in conjunction with the timing circuit 306 shown in FIG. 3 and described in the accompanying text. It is contemplated that input node 402 of sense circuit 302 is coupled to first input signal 303 of timing circuit 306 while second input signal 305 is connected to full assert node 403, which is tied to input terminal 413 of second transistor 412 through resistor 411. As described previously, timing circuit 306 is configured to assert first input signal 303 for a first duration. During this first duration, first transistor 404 is activated and the voltage of sense node 410 is indicative of the termination impedance of SCSI bus 118. In an embodiment of the present invention in which signal conductor 117 of SCSI bus 118 is, for example, the RESET signal, it is necessary to fully assert the signal after the termination impedance has been sensed by sense circuit 302. To accomplish this full assertion of the RESET signal, a second input signal 305 is produced by timing circuit 306 and routed to full assert node 403 to activate second transistor 412. Second transistor 412 includes output terminals 415a, which is connected to signal conductor 117, and 415b, connected to ground. When second input signal 305 is activated by timing circuit 306, current flows from full assert node 403 through resistor 411 to input terminal 413 driving second transistor 412 into saturation and thereby fully asserting signal conductor 117. In this manner, the RESET signal (or any other SCSI signal represented by signal conductor 117) is fully asserted after the sensing function is completed so that each peripheral device connected to SCSI bus 118 will be reset appropriately.

Comparator circuit 304 includes a comparator input node 421 and a comparator output node 422. Input node 421 is connected to sense circuit output node 420. Comparator circuit is configured to indicate whether the sense circuit output voltage present at sense circuit output node 420 is within a predetermined specified voltage range. The embodiment of comparator circuit 304 depicted in FIG. 4 includes a reference voltage stage 428 and a window detection circuit 440. Reference voltage stage 428 includes a voltage divider circuit 429 coupled between ground and an output node 426 of voltage generator 424. Voltage divider circuit 429 is configured to produce a high voltage reference level $V_{REFH}$ and a low voltage reference level $V_{REFL}$ on high voltage reference node 430 and low voltage reference node 432 respectively. In the depicted embodiment, voltage divider circuit 429 is comprised of a series of three resistors indicated by reference numerals 431a, 431b, and 431c (collectively referred to as resistors 431). By appropriate setting of resistors 431, voltage divider circuit 429 can be designed to provide predetermined values for $V_{REFH}$ and $V_{REFL}$. These reference voltage levels define the acceptable limits of the voltage sensed at sense node 410 of sense circuit 302. Sensed values exceeding the upper or lower limits generated by voltage divider circuit 429 indicate out of specification and, therefore, improper termination of SCSI bus 118.

The embodiment of window detection circuit 440 depicted in FIG. 4 includes a pair of comparators 442 and 444. A positive input terminal of first comparator 442 is connected to high voltage reference node 430 while the negative input terminal is connected to input node 421 of comparator circuit 304. A negative input terminal of second comparator 444 is connect to low voltage reference node 432 while the positive input terminal is connected to input node 421 of comparator circuit 304. In the preferred embodiment, comparators 442 and 444 are simple analog to digital devices in which the digital output is high if the voltage at the positive input terminal is greater than the voltage at the negative terminal. Thus it will be appreciated that the outputs of first and second comparators will both be high only if the voltage at comparator input node 421 is within the voltage window defined by reference voltage stage 428. If the voltage at comparator circuit input node 421 is either greater than or less the corresponding upper or lower limit, the output of the corresponding comparator 442 or 444 will transition low. In the embodiment depicted, the outputs of both comparators 442 and 444 are of the open collector configuration and may be suitably tied together to provide a dot product (logical AND function) of the two outputs without the need for additional logic gates. The digital output of window detector 440 is connected to output node 422 of comparator circuit 304. In this manner, the digital output of comparator circuit 304 is indicative of whether the voltage at input node 421 is within a predetermined voltage window thereby indicating, in conjunction with sense circuit 302 whether the termination impedance of SCSI bus 118 is correct.

Figure 5:
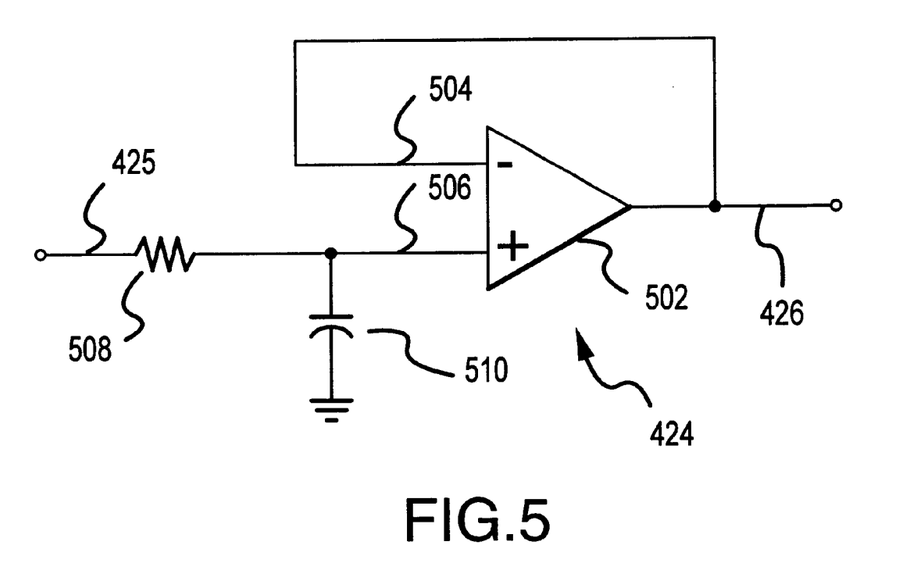
FIG. 5 is a circuit diagram of an embodiment of a voltage generator.

Turning now to FIG. 5, an embodiment of voltage generator 424 is shown as including an operational amplifier 502. The output of amplifier 502 is fed back to its inverting input 504 and is connected to output node 426 of voltage generator 424. The non-inverting input of amplifier 502 is tied to a reference signal node 425 through series resistor 508. Preferably, a stabilizing capacitor 510 is coupled to non-inverting input 506 to provide additional stabilization to the generated voltage. Reference signal node 425 is, in one embodiment, tied to a second signal conductor 119 of SCSI bus 118. Second signal conductor 119 represents any SCSI signal other than the signal conductor 117 used for the sensing function described above. Using the circuit of FIG. 5, voltage generator 424 produces a stable output voltage reflective of the quiescent bias voltage of SCSI bus 118.

It will be apparent to those skilled in the art having the benefit of this disclosure that the present invention contemplates a practical circuit and method for detecting inappropriate termination of a SCSI bus. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A bus termination impedance verification circuit comprising:

a sense circuit including a sense input node and a sense output node wherein said sense input node is connected to a signal conductor of a bus, and further wherein the voltage of said sense output node is indicative of a termination impedance of said bus when said sense circuit input node is activated;

a comparator circuit including a comparator input node and a comparator output node, wherein said comparator input node is connected to said sense circuit output node and further wherein said comparator circuit is configured wherein said comparator output node is indicative of whether the voltage of said comparator input node is within a specified voltage range; and wherein said sense circuit comprises a resistor and a transistor, said transistor including an input terminal and a pair of output terminals, wherein said resistor and said pair output terminals of said transistors are coupled in series between ground and said signal conductor.

2. The circuit of claim 1, wherein a first terminal of said resistor is coupled to said signal conductor and said sense output node.

3. The circuit of claim 2, wherein said transistor comprises an npn bipolar transistor and further wherein a collector terminal of said transistor is coupled to a second terminal of said resistor and an emitter terminal of said transistor is grounded.

4. The circuit of claim 1, wherein said transistor comprises an MOS transistor.

5. A bus termination impedance verification circuit comprising:

a sense circuit including a sense input node and a sense output node wherein said sense input node is connected to a signal conductor of a bus, and further wherein the voltage of said sense output node is indicative of a termination impedance of said bus when said sense circuit input node is activated;

a comparator circuit including a comparator input node and a comparator output node, wherein said comparator input node is connected to said sense circuit output node and further wherein said comparator circuit is configured wherein said comparator output node is indicative of whether the voltage of said comparator input node is within a specified voltage range; and wherein said comparator circuit includes a reference voltage stage configured to generate a high voltage reference level and a low reference voltage reference level, and wherein said comparator circuit further includes a window detection circuit configured to receive said high voltage reference level, said low voltage reference level, and said comparator input node and further configured to indicate if a voltage of said comparator input node is greater than or equal to said low voltage reference level and less than or equal to said high voltage reference level.

6. The circuit of claim 5, wherein said reference voltage stage includes a voltage divider circuit coupled to a reference voltage generator wherein said voltage divider circuit is configured to produce a high voltage reference level on a high voltage reference node of said divider circuit and a low voltage reference level on a low voltage reference node of said divider circuit.

7. The circuit of claim 6, wherein said voltage divider circuit comprises three resistors coupled in series between ground and an output node of said reference voltage generator.

8. The circuit of claim 6, wherein said reference voltage generator comprises:

an operational amplifier including an inverting input terminal, a non-inverting input terminal, and an output terminal, wherein said output terminal is tied to said inverting input terminal; and a reference voltage conductor connected to said non-inverting input terminal of said amplifier and tied to a reference signal conductor of said bus through a series resistor.

9. The circuit of claim 8, wherein said reference voltage generator further comprises a stabilizing capacitor coupled between said reference voltage conductor and ground.

10. The circuit of claim 5, wherein said window detection circuit comprises;

a first comparator including a positive input connected to said high voltage reference level and a negative input connected to said comparator input node, and an output node wherein a logical state of said output node is indicative of whether a voltage of said positive input is greater than a voltage of said negative input; and a second comparator including a negative input connected to said low voltage reference level and a positive input connected to a said comparator input node, and an output node wherein a logical state of said output node is indicative of whether a voltage of said negative input is less than a voltage of said positive input.

11. The circuit of claim 10, wherein said output node of said first comparator and an output of said second comparator are connected to a common node and wherein a logical state of said common node is the dot product of said first output node and said second output node.

12. A SCSI controller comprising:

a local bus control block configured to transmit and receive local bus address, data, and control signals to and from a local bus;

a SCSI control block configured to transmit and receive SCSI bus address, data, and control signals to and from a SCSI bus;

processing logic coupled between said local bus control block and said SCSI control block, wherein said processing logic is configured to receive and interpret said local bus control and address signals from said local bus and said SCSI control and address signals from said SCSI bus, and further configured to pass data between said local bus control block and said SCSI control block in response to said received signals; and a termination impedance verification circuit including:

a sense circuit including a sense input node and a sense output node wherein a sense node of said sense circuit is connected to one of said SCSI control signals, and further wherein the voltage of said sense output node is indicative of a termination impedance of said SCSI bus when said sense circuit input node is activated; and a comparator circuit including a comparator input node and a comparator output node, wherein said comparator input node is connected to said sense circuit output node and further wherein said comparator circuit is configured such that said comparator output node is indicative of whether the voltage of said comparator input node is within a specified voltage range.

13. The controller of claim 12, wherein said termination impedance verification circuit further includes an assert transistor including an input terminal coupled to an assert input node and a pair of output terminals coupled between said one of said SCSI control signals and ground.

14. The controller of claim 13, wherein said termination impedance verification circuit further includes a timing circuit, wherein an input node of said timing circuit is connected to one of said SCSI control signals produced by said processing logic of said controller, and wherein said timing circuit is configured to activate said sense circuit for a first duration and, thereafter, to activate said assert transistor for a second duration.

15. The controller of claim 12, wherein said local bus comprise a PCI bus.

16. A computer system comprising:

a central processing unit (CPU);

an external cache memory;

a memory controller/bus bridge (MC/BB) wherein said CPU, said external cache memory, and said MC/BB are coupled via a processor bus, and further wherein said MC/BB is configured to transmit and receive address, data, and control signals to and from a local bus;

a main memory coupled to said MC/BB over said local bus; and a SCSI controller connected to said local bus, wherein said SCSI controller is configured to provide a bridge between said local bus and a SCSI bus coupled to said SCSI controller, and further wherein said SCSI controller includes a bus termination impedance verification circuit coupled to one of a plurality of SCSI control signals of said SCSI bus, wherein said bus termination impedance verification circuit is configured to detect the presence of improper bus termination on said SCSI bus.

17. The system of claim 16, wherein said central processing unit is an X86 family processor.

18. The system of claim 16, wherein said local bus comprises a PCI bus.

19. The system of claim 16, wherein said bus termination impedance verification circuit includes:

a sense circuit including a sense input node and a sense output node wherein said sense input node is connected to one of said SCSI control signals, and further wherein the voltage of said sense output node is indicative of a termination impedance of said SCSI bus when said sense circuit input node is activated; and a comparator circuit including a comparator input node and a comparator output node, wherein said comparator input node is connected to said sense circuit output node and further wherein said comparator circuit is configured such that said comparator output circuit is indicative of whether the voltage of said comparator input node is within a specified voltage range.

* * * * *